United States Patent
Plummer

[11] 3,971,052
[45] July 20, 1976

[54] COMPACT GALILEAN VIEWFINDER
[75] Inventor: William T. Plummer, Concord, Mass.
[73] Assignee: Polaroid Corporation, Cambridge, Mass.
[22] Filed: Apr. 21, 1975
[21] Appl. No.: 569,763

[52] U.S. Cl. .............................................. 354/219
[51] Int. Cl.² ........................................ G03B 13/06
[58] Field of Search ........... 354/219, 220, 221, 222, 354/223, 224, 225, 166, 162; 350/212, 230

[56] References Cited
UNITED STATES PATENTS

| | | |
|---|---|---|
| 1,178,476 | 4/1916 | Becker .............................. 354/220 |
| 1,210,134 | 12/1916 | Becker .............................. 354/222 |
| 2,124,161 | 7/1938 | Cook et al. ........................ 354/166 |
| 3,253,528 | 5/1966 | Bing .................................. 354/222 |

*Primary Examiner*—L. T. Hix
*Assistant Examiner*—Alan Mathews
*Attorney, Agent, or Firm*—John W. Ericson

[57] ABSTRACT

A compact Galilean viewfinder, having an objective comprising a plano-convex negative de-centered front element, with its optical axis below the central axis of the finder, and an eye lens comprising a plano-convex rear element of positive power that is de-centered with its optical axis below the central axis of the finder, in which the eye lens is tilted to reduce astigmatism and bent to reduce coma.

5 Claims, 5 Drawing Figures

COMPACT GALILEAN VIEWFINDER

This invention relates to photography, and particularly to a novel Galilean viewfinder for photographic cameras and the like.

The eye level Galilean viewfinder is a conventional form that has been widely used for viewing and framing images to be photographed with a camera. Such finders are discussed, for example, on page 223 of "Lenses in Photography" by Rudolf Kingslake, published by The Case-Hoyt Corporation for Garden City Books, of Garden City, N. Y., in 1951.

In order to provide a view clear of the camera structure, the conventional Galilean finder necessarily protrudes some distance above the body of the camera. One approach to reducing the height of a viewfinder is to use a de-centered negative component at the front of the camera, which has the property that it deflects the angle of view upwardly, clearing the body of the camera so that the observer can place his eye above and behind the camera and see an image along a line of sight parallel to the optical axis of the camera and closer to the optical axis than the eye. Such an arrangement is shown and described, for example, in, U.S. Pat. No. 1,178,476, issued on Apr. 4, 1916 to Joseph Becker. An improvement in such finders, in which the negative element or elements of the negative component are tilted to reduce distortion, is disclosed in U.S. Pat. No. 1,210,137, granted on Dec. 26, 1916 to Joseph Becker for Finder. Such finders offer reduced parallax, and compactness of construction. However, by virtue of the principle upon which they are constructed, the observer's line of sight is changed when he shifts his eye from the viewfinder to the object which he has seen in the viewfinder.

One object of this invention is to retain some of the advantages of the compactness of the Becker construction, while obtaining the advantage line of sight of the observer is essentially the same whether he is viewing an object through the viewfinder or directly. In other words, if a user is viewing an object through a viewfinder in accordance with the invention with one eye, and viewing the object directly with the other eye, both eyes will appear to the observer to be looking in the same direction.

Further objects of the invention are to reduce coma and astigmatism in viewfinders of the kind employing de-centered optics.

The above and other objects of the invention are attained by a novel reversed Galilean viewfinder construction incorporating a plano-concave front element which is de-centered, in the sense that it may be thought of as part of a centered element that has its optical axis below the central axis of the finder. The viewfinder further comprises an eye lens that is a positive, generally plano-convex rear element. The rear element is also de-centered, in that it may be considered as part of a larger plano-convex lens that has its optical axis below the center of the finder.

The eye lens is bent, with the constraint that one side be plane, to reduce coma, and is tilted at an angle selected to minimize astigmatism. By this arrangement, a clear bright image of the subject to be photographed that is relatively free of distortion, coma, field curvature and astigmatism can be attained in a compact finder.

The manner in which the apparatus of the invention is constructed, and its mode of operation, will best be understood in light of the following detailed description, together with the accompanying drawings, of an illustrative embodiment thereof.

In the drawings, FIG. 1 is a schematic perspective sketch, with parts broken away, and parts omitted, illustrating a camera equipped with a Galilean viewfinder in accordance with the invention;

Figure 1:
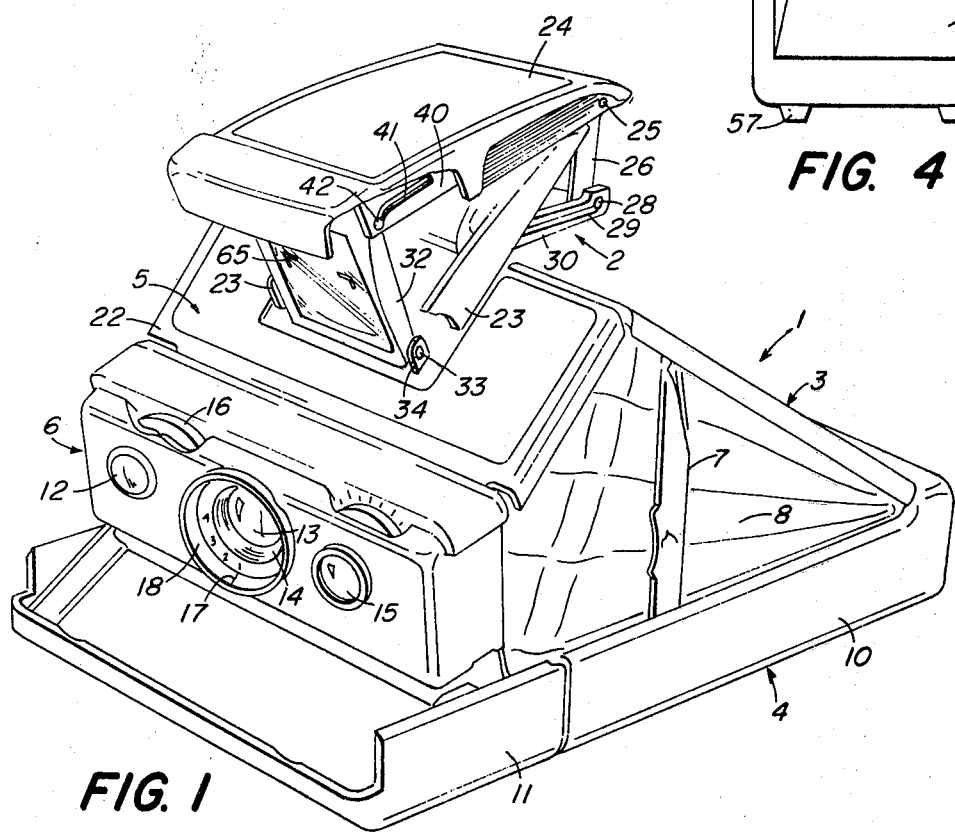

Referring to FIG. 1, there is shown a folding camera generally designated 1 on top of which a folding Galilean viewfinder in accordance with the invention is shown and generally designated 2. While the camera 1 may be of any conventional construction, as shown, it clearly resembles the Polaroid SX-70 Land camera, as made and sold by the Polaroid Corporation of Cambridge, Mass. In fact, the Polaroid SX-70 Land camera can be modified for use with the apparatus of the invention by simply substituting the viewing system of the invention for the through-the-lens viewing system of the SX-70 camera, and adding an external focusing scale. The viewing system for the SX-70 camera is essentially as shown and described in U.S. Pat. No. 3,710,697, issued on Jan. 16, 1973 to Richard J. Fraser and John E. McGrath, Jr., for Folding Camera Viewfinder, and assigned to the asignee of this application.

Referring again to FIG. 1, the camera may comprise four housing sections generally designated 3, 4, 5 and 6 erectable to the position shown in FIG. 1 and there held by a suitable erecting link 7. As in the manner of the Polaroid SX-70 Land camera, the bellows 8, shown in FIG. 1, completes the enclosure of an exposure chamber 9, indicated in FIG. 2.

The housing portion generally designated 6 comprises a lens board and shutter housing in which there are mounted a shutter button 12, a taking lends 13 in a focusing barrel 14, and a photocell window 15 through which a conventional photocell forming a part of any conventional exposure control mechanism may be exposed. A focusing knob 16 is employed to focus the lens 13 by rotating and advancing or retracting its front element, in the conventional manner not shown in detail, such that a focusing scale, formed on the barrel 14, moves relative to an index marked 17 on a lens bezel 18 surrounding the barrel 14.

Figure 2:
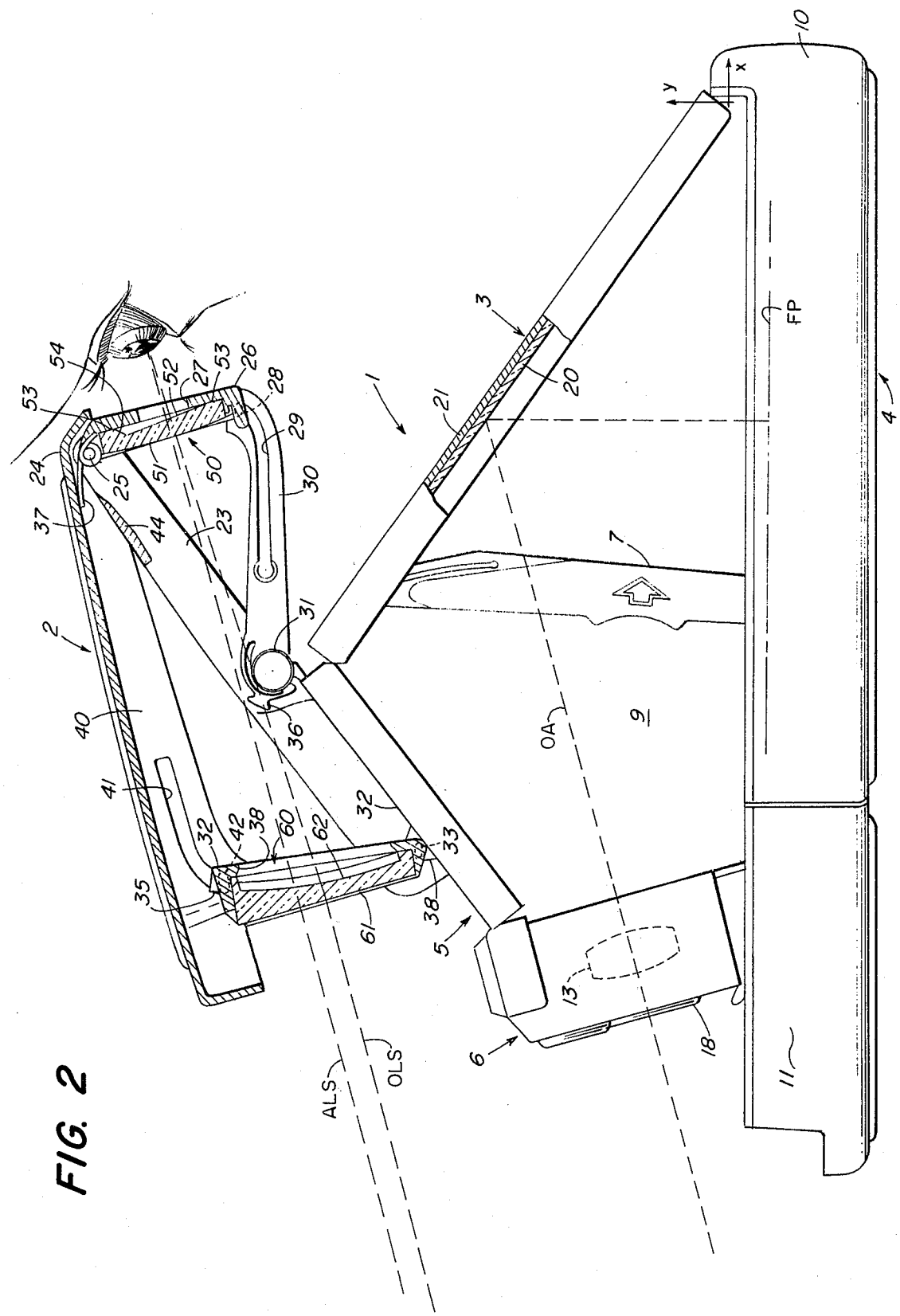
FIG. 2 is a schematic elevational view, on an enlarged scale, of the camera of FIG. 1, with parts shown in cross section, parts omitted, and parts broken away.

Referring to FIG. 2, the photographic optical system of the camera 1 here shown for illustrative purposes comprises the taking lens 13, and a fixed mirror 20 mounted on the top wall 21 of the housing portion 3 and positioned to reflect an image onto a film plane FP. The film may be located in the camera in the manner shown in more detail in U.S. Pat. No. 3,710,697, cited above.

It will be apparent that a moving reflex mirror member is not required with the viewfinder of the invention, so that the mirror 20 may be fixed in the appropriate position to form an unreversed image on the film at the focal plane FP. Any conventional shutter mechanism, not shown, of the normally closed variety that is opened to make an exposure, and closed to terminate the exposure, may be used to normally block the optical path from the lens 13 to the film plane FP. As indicated, the optical axis of the camera extends through the optical axis of the lens 13 along the line OA, and thence from the mirror 20 along the line OA' to the film plane FP.

Referring to FIG. 1, the viewfinder 2 is preferably made in the folding configuration generally similar to that shown in the above-cited U.S. Pat. No. 3,710,697. In particular, the upper housing member 5 comprises a top wall portion 22. Formed integrally with the top wall 22 are a pair of outstanding arms 23. A viewfinder cap 24 is pivotly mounted to the rear ends of the arms 23, as suggested at 25 in FIGS. 1 and 2.

A pin 25, on which the viewfinder cap is hinged to the arms 23, also serves to rotatably support an eye lens housing 26 formed with a rectangular viewing aperture 27 as seen in FIG. 2. Comparing FIGS. 1 and 2, the eye lens housing 26 is formed with posts 28 at its lower corners which are received in guide slots 29 formed in arms 30 that are pivoted to the arms 23 as suggested at 31.

A generally rectangular objective lens housing 32 is formed with posts 33 at its lower corners which are pivoted in arms such as 34 formed integral with the panel 22. As indicated in FIG. 2, the objective lens housing 32 may be provided with a projecting corner 35 on one side at the top for cooperaton with a latch member 36 formed on one of the arms 30 to latch the viewfinder in its folded position.

The viewfnder 2 is urged towards its erected position by a first spring 37 wound around the pin 25. The spring 27 has one end engaging the viewfinder cap 24 and another end fixed to one of the arms 23.

The eyepiece is urged towards its erected position, as shown in FIG. 2, by a corresponding second spring, not shown, also wound about the pin 25, and acting between the eye lens housing 26 and the viewfinder cap. This may be in the manner shown, for example, at 102 in FIG. 1 of the above-cited U.S. Pat. No. 3,710,697.

A rectangular aperture 38 in the objective lens housing 32 defines a mask which is seen, somewhat out of focus, as the frame of the scene to be photographed. As is known, the degree of blur in the frame of a Galilean viewfinder is inversely proportional to the length of the viewfinder.

As indicated in FIGS. 1 and 2, a pair of downwardly dependent ears 40 formed with guide slots 41 are formed integral with the viewfinder cap 24, and guidingly receive posts such as 42 formed on the upper sides of the objective lens housing 32. These posts 42 stop the viewfinder cap in its erected position as shown in FIG. 2. As indicated in FIG. 2, the arms 23 are joined by a cross bar 44, which strengthens the assembly.

Figure 5:
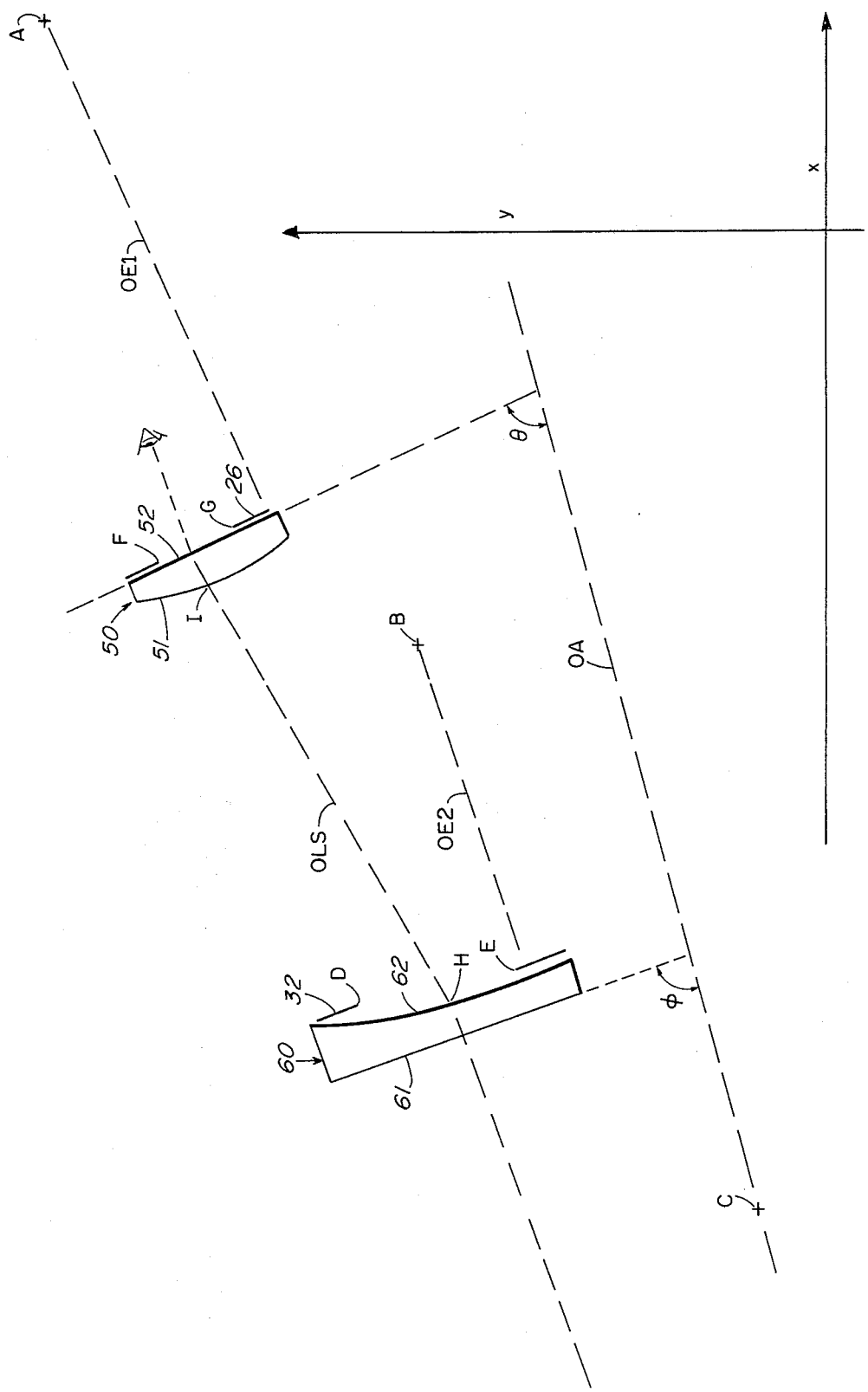
FIG. 5 is a diagram illustrating certain physical and optical relationships between the elements of a viewfinder in accordance with the invention.

Further description of the optical system will frequently be referenced to FIGS. 2 and 5, which together show both the physical and the optical characteristics of a viewfinder in accordance with the invention. FIG. 5 shows the eye lens and the objective schematically, in terms of their optically effective surfaces, in relation to the optical axis of the camera. These elements and parameters descriptive of the system are shown in a coordinate system of axis $x$ and $y$. The coordinate system shown is chosen simply because data in that coordinate system are available; it happens to be centered on the pivot axis about which the housing portion 3 is hinged to the housing portion 10 (FIG. 2), in the Polaroid SX-70 Land camera.

Mounted in any conventional manner in the eye lens housing 26 (FIG. 2) is an eye lens generally designated 50. The optically effective portion of the eye lens 50 is that portion that is visible through the rectangular aperture 27 in the eye lens housing 26. Regions of the lens 50 beyond the visible portion are formed in a manner convenient for mounting the lens, and are not optically effective in the viewing system.

The lens 50 has a spherical front surface 51 with a center of curvature located as somewhat schematically indicated at the point A in FIG. 5. The optical axis of the element 50 is indicated at OE1 (FIG. 5), and this optical axis is normal to a planar face 52 formed as the optically effective rear surface of the lens 50 (FIGS. 2 and 5).

Figure 4:
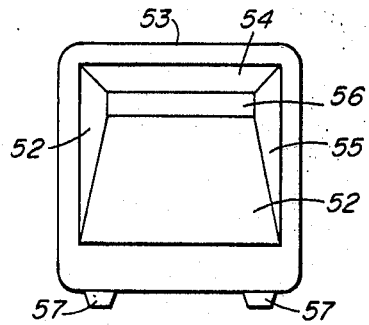
FIG. 4 is a schematic plan view of the eye lens forming a part of the apparatus of FIGS. 1 and 2, taken essentially along the lines 4—4 in FIG. 2.

As indicated in FIGS. 2 and 4, the lens 50 is conveniently formed with a planar edge surface 53 joining the surface 52 by intermediate ramp portions 54 and 55, the ramp portion 54 being continued to the plane surface 52 by a plane surface 56 that is parallel to the outer face 53. As noted above, only the surface 52 has any optical effect in this combination, the other shapes and surfaces being formed for convenience in mounting. As indicated in FIG. 4, if desired, tabs such as 57 may be molded integral with the lens 50 to cooperate with corresponding recesses in the lens housing 26 to facilitate mounting the lens, if so desired.

It will be apparent that one practical manner in which a lens of the configuration of the lens 50 can be manufactured is by precision injection molding. In one practical embodiment of the invention, the lens 50 was molded from polymethyl methyacrylate with an index of refraction of 1.492.

Referring to FIG. 5, the plane of the face 52 is normal to the optical axis OE1 of the eye lens 50, and makes an angle theta with the optical axis OA of the camera. This angle theta is selected to minimize astigmatism in the lens, and most preferably to minimize the astigmatism in a region just above the center of the field of view of the viewfinder where the subject matter of most interest is most likely to be found. Decreasing the angle theta in FIG. 5 would improve the lower portion of the field, while increasing the angle would improve the upper portion.

The lens 50 is bent, in the optical sense, with the constraint that the surface 52 be plane, primarily to correct for coma and secondarily, as an incident to the correction for coma, to correct for field curvature. Basically, this bending is effected by locatng the lends 50 with its plane surface 52 facing outwardly, as shown.

In a particular embodiment of the lens adapted to be used with the Polaroid SX-70 Land camera, which has an objective with a focal length of approximately 4.557 inches, the radius of curvature of the surface 51 was 3.100 inches. With this exemplary eye lens, the best angle theta was found to be about 80.9 degrees.

The objective lens of a viewfinder in accordance with the invention is shown at 60 in FIG. 2. The lens 60 is mounted in the lens housing 32 in any conventional manner, and comprises a plane front surface 61 and a concave spherical rear surface 62. The surface 62 has a center of curvature located generally as schematically indicated at B in FIG. 5, the optical axis of the element 60 being indicated at OE2 in FIG. 5 in a line well below the central longitudinal axis of the viewfinder system, which is generally along the line OLS in FIGS. 2 and 5.

Figure 3:
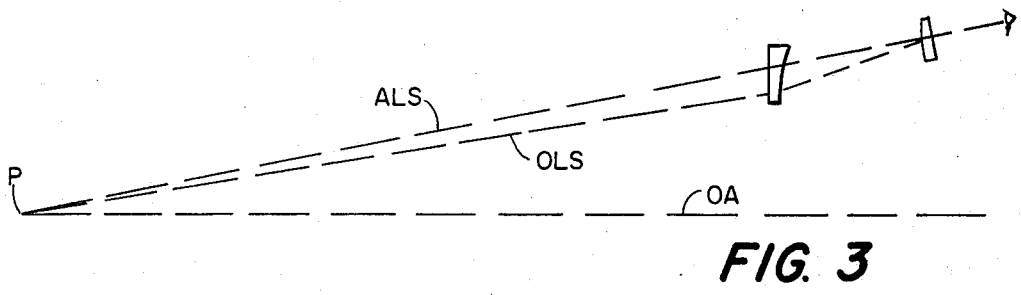
FIG. 3 is a diagram illustrating certain optical relationships in the camera of FIGS. 1 and 2.

The line ALS in FIG. 2 is selected as an actual line of sight which, referring to FIG. 3, is considered to be a line between the eye of the observer looking at a point P and the point P. When the point P is seen as the center of the field of view in the finder, with the eye properly positioned relative to the aperture 27 in the eye lens housing 26 as seen in FIG. 2, and the optical axis of the camera is directed through the point P, the lines ALS, OLS and OA coincide at the point P at a distance from the camera selected to effect a desired compromise between near and far framing.

For use with a camera using the taking optics of the Polaroid SX-70 Land camera, a convenient distance for the point P is approximately 8 feet from the camera. As indicated in FIG. 1, subsidiary framing marks suggested at 65 may be molded as small protrusions on the front surface of the lens 60 to aid in framing very close objects.

In the practical embodiment of the invention using the eye lens described above, the lens 60 was molded from styrene having an index of refraction of 1.59, and the radius of curvature of the surface 62 was 1.858 inches. The plane face 61 of the lens 60, which is normal to the optical axis OE2, makes an angle phi with the optical OA, which, in the practical embodiment described, was 89.6°. With a de-centered plano-concave lens, 90° is near enough to the point of minimum distortion, so that the actual angle chosen is more for convenience than any other reason so long as it is near 90°. The principal compensation for distortion is made by bending the lens 60, with the constraint that the front surface be plane, a consideration noted in Becker U.S. Pat. No. 1,210,137, cited above.

Comparing FIGS. 2 and 3, the line ALS, between the eye of the observer and the point P, would be the line along which the observer would look if the viewfinder comprising the elements 50 and 60 were removed. With the viewfinder in place, the optical line of sight OLS, between the point P and the eye of the observer, along the central ray is below the line ALS. When a ray along the optical line of sight OLS encounters the lens 60, because of the de-centering of the lens 60, it is deflected upwardly. When it reaches the positive lens 51, because of the de-centering of that element, the optical line of sight is again deflected until it emerges essentially coincident with the actual line of sight ALS. Thus, to the observer, if the camera is aimed with the center of the field at the point P and the observer does not change his direction of sight when the camera is moved out of his field of view, he will continue to look in the same direction to see the point P.

From another point of view, with the negative objective lens 60 de-centered so that its optical axis is below the longitudinal axis of the finder, it is thicker at the top. Similarly, the de-centered positive eye lens 26, having its optical axis below the longitudinal axis of the finder, is thicker at the bottom. This arrangement may be considered as adding oppositely directed prisms to the dioptic power of the elements, so that a ray entering the system from the left in FIG. 2 and parallel to the longitudinal axis of the finder is refracted upwardly by the negative element, and then downwardly, to essential parallelism with the longitudinal axis, by the positive element.

Some correction for parallax is made by the use of the de-centered elements as described, but the controlling consideration is the gain in compactness, in terms of the height of the lenses of the viewfinder in their erected positions above the optical axis of the camera in its erected position.

To complete the description of the specific embodiment of the invention to which exemplary reference has already been made, there follows a discussion of the key parameters of the specific embodiment with reference to FIG. 5. In addition to the centers of curvature A and B, of the eye lens 50 and the objective lens 60, reference will be made to additional points C through I in FIG. 5. Coordinates given are in inches.

Point A in FIG. 5 has the coordinates $y = 4.26672$, $x = 0.87093$. As noted above, the radius of the surface 51 is 3.100 inches. The equation of the optical axis OE1 is $y = 0.40697x + 3.91228$.

Point B in FIG. 5 has the coordinates $y = 2.8408$, $x = -2.9512$. As noted above, the radius of the surface 62 is 1.858 inches. The equation of the optical axis OE2 is $y = 0.27066x + 3.6396$.

Point C in FIG. 5 is a point along the camera's optical axis OA at its intersection with the rear surface of the rear element of the objective 13. Its coordinates are $y = 0.768$, $x = -4.9810$. The equation of the axis OA is $y = 0.2695x + 2.10269$.

Point D in FIG. 5 locates the upper edge of the framing mask in the objective lens housing 32. Its coordinates are $y = 3.1670$, $x = -4.6848$.

Point E is the lower edge of the framing aperture in the objective lens housing 32. Its coordinates are $y = 2.1731$, $x = -4.5486$.

The equation for the portion of the optical line of sight OLS between the observer's eye and the plane surface 52 of the eye lens is $y = 0.28448x + 4.2163$. This equation very nearly represents the line ALS between the eye and the point P in FIG. 5. The points F and G mark the upper and lower edges 1 respectively, of the aperture 27 in the eye lens housing 26. They are equidistant from the axis OLS at its intercept with the surface 52. The distance from F to G is selected as a compromise between framing error and eye relief. A presently preferred distance from F to G is 0.250 inches, which provides reasonable eye relief for a person wearing glasses without allowing serious framing errors.

The equation for the optical line of sight OLS between the eye lens surface 51 and the surface 62 of the objective lens 60 is $y = 0.37731X + 4.41193$. The separation between the surfaces 51 and 62 along the axis OLS is 2.8192 inches.

The point H is the intercept of the axis OLS with the surface 62. Its coordinates are $y = 2.6031$, $x = -4.7939$.

The point I is the intercept of the axis OLS with the surface 51. Its coordinates are $y = 3.5984$, $x = 2.1562$.

The axis ALS, OLS and OA intersect as a point about 101.6 inches, along the axis OA, to the left of the point C in FIG. 5. To illustrate the closeness with which the example given approximates the theoretical ideal of parallelism between the axis ALS and OLS, the angle between the axis OA and the $x$ axis in FIG. 5 is 15.0°, the angle between the axis OLS and the $x$ axis is 15.88°, and the angle between the axis ALS and the $x$ axis is 15.99°, with the other values given.

The surface 52 lies in a plane normal to the $x$ and $y$ axis, intersecting that plane in a line given by $y = -2.45720X - 1.37791$. Similarly, the surface 61 lies in a plane normal to the $x$ and $y$ axis and intersecting the $x$-$y$ plane in a line given by $y = -3.6947X - 15.5575$.

While the invention has been described with reference to the details of a particular embodiment thereof, many changes and variations will occur to those skilled in the art upon reading this description. Such can obviously be made without departing from scope of the invention.

Having thus described the invention, what is claimed is:

1. In a Galilean finder, a negative de-centered objective lens and a positive de-centered eye lens, said lenses being de-centered in the same sense to cause refractions in opposite senses of parallel rays entering said finder.

2. A reversed Galilean finder, comprising a plano-concave objective lens element having an optical axis displaced from its geometrical center, a plano-convex eye lens element having an optical axis displaced from its geometrical center, and means for mounting said elements in spaced relationship with the concave side of said objective lens element confronting the convex side of said eye lens element with said optical axis displaced in the same sense from a line joining said geometrical centers.

3. A reversed Galilean viewfinder for use with a camera having a predetermined optical axis, comprising a negative de-centered objective lens and a positive de-centered eye lens, means for mounting said lenses on a camera in spaced relation with said objective lens positioned to refract a ray parallel to said optical axis away from said optical axis and said eye lens positioned to refract said ray back to substantial parallelism with said optical axis.

4. In a Galilean viewfinder, a negarive de-centered eye objective lens and a positive de-centered eye lens, said lens being de-centered in the same sense to cause refractions in opposite senses of parallel rays entering said viewfinder, said objective lens being bent to reduce distortion, said eye lens being bent to reduce coma and field curvature, said eye lens being tilted to reduce astigmatism.

5. In combination with a camera having a first optical axis, a Galilean viewfinder comprising a plano-concave objective lens element having a second optical axis displaced from its geometrical center, a plano-convex eye lens element having a third optical axis displaced from its geometrical center, means for mounting said objective lens element on said camera with its plane surface facing object space and with said second optical axis substantially parallel to said first optical axis and between the geometrical center of said objective lens element and said first optical axis, and means for mounting said eye lens element on said camera in spaced relation to said objective lens element with its convex surface facing the concave surface of said eye lens and with said third optical axis intersecting the plane of the plane surface of said eye lens element between the geometrical center of said eye lens element and said first optical axis, said third optical axis being inclined to said first optical at an angle selected to minimize astigmatism in a predetermined region of the field of said viewfinder.

* * * * *